US009245100B2

(12) United States Patent
Marco et al.

(10) Patent No.: US 9,245,100 B2
(45) Date of Patent: Jan. 26, 2016

(54) METHOD AND APPARATUS FOR UNLOCKING A USER PORTABLE WIRELESS ELECTRONIC COMMUNICATION DEVICE FEATURE

(71) Applicant: Google Technology Holdings LLC, Mountain View, CA (US)

(72) Inventors: Limor P. Marco, Buffalo Grove, IL (US); Yukiko Kimoto, Mundelein, IL (US); Akila Varadarajan, Libertyville, IL (US); Felipe Wolff Ramos, Schaumburg, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 71 days.

(21) Appl. No.: 13/827,868

(22) Filed: Mar. 14, 2013

(65) Prior Publication Data
US 2014/0283013 A1    Sep. 18, 2014

(51) Int. Cl.
*G06F 21/32* (2013.01)
*H04W 12/08* (2009.01)

(52) U.S. Cl.
CPC .............. *G06F 21/32* (2013.01); *H04W 12/08* (2013.01)

(58) Field of Classification Search
CPC ......... G06F 21/10; G06F 21/31; G06F 3/017; G06F 3/0481; G06F 21/52; H04W 12/06
USPC .............................. 726/2, 16–17, 19; 715/863
See application file for complete search history.

(56) References Cited

U.S. PATENT DOCUMENTS

| 4,549,801 | A * | 10/1985 | Winter ........................... 396/106 |
| 8,109,301 | B1 * | 2/2012 | Denise ........................... 141/360 |
| 8,605,941 | B2 * | 12/2013 | Clarkson ........................ 382/103 |
| 2002/0181773 | A1 * | 12/2002 | Higaki et al. ................. 382/190 |
| 2003/0095154 | A1 * | 5/2003 | Colmenarez ................. 345/863 |
| 2008/0256494 | A1 * | 10/2008 | Greenfield .................... 715/863 |
| 2009/0249478 | A1 * | 10/2009 | Rosener ................... G06F 21/31 726/19 |
| 2009/0262187 | A1 * | 10/2009 | Asada et al. .................... 348/77 |
| 2010/0019760 | A1 * | 1/2010 | Huang ........................... 324/176 |
| 2010/0104134 | A1 * | 4/2010 | Wang et al. ................... 382/103 |
| 2010/0138797 | A1 * | 6/2010 | Thorn .......................... 715/863 |
| 2010/0234077 | A1 * | 9/2010 | Yoo et al. ...................... 455/566 |
| 2010/0235889 | A1 * | 9/2010 | Chu et al. .......................... 726/4 |
| 2010/0281435 | A1 * | 11/2010 | Bangalore et al. ............ 715/863 |
| 2010/0328680 | A1 * | 12/2010 | Moench et al. ............... 356/615 |
| 2011/0107216 | A1 * | 5/2011 | Bi ................................. 715/716 |

(Continued)

FOREIGN PATENT DOCUMENTS

| EP | 2477155 A1 | 7/2012 |
| EP | 2479707 A1 | 7/2012 |

*Primary Examiner* — Hadi Armouche
*Assistant Examiner* — Sher A Khan
(74) *Attorney, Agent, or Firm* — Shumaker & Sieffert, P.A.

(57) ABSTRACT

Embodiments provide a method and apparatus for unlocking a feature of a user portable wireless electronic communication device. The user portable wireless electronic communication device can include a camera configured to capture a characteristic of a waving hand of a user across the user portable wireless electronic communication device. The user portable wireless electronic communication device can include a controller coupled to the camera. The controller can determine whether the user is authorized to access a locked feature of the user portable wireless electronic communication device based on the captured characteristic. The controller can unlock the locked feature if the user is authorized to access the feature.

12 Claims, 3 Drawing Sheets

(56) References Cited

U.S. PATENT DOCUMENTS

| | | | |
|---|---|---|---|
| 2011/0122085 A1* | 5/2011 | Chang | 345/174 |
| 2011/0134251 A1* | 6/2011 | Kim et al. | 348/164 |
| 2012/0007713 A1* | 1/2012 | Nasiri et al. | 340/5.81 |
| 2012/0133580 A1* | 5/2012 | Kirby et al. | 345/156 |
| 2012/0176801 A1* | 7/2012 | You | 362/311.02 |
| 2012/0258773 A1* | 10/2012 | Alvarez Rivera | G06F 1/1656 455/556.1 |
| 2012/0312956 A1* | 12/2012 | Chang et al. | 250/201.1 |
| 2013/0111408 A1* | 5/2013 | Berus | G06F 17/30873 715/835 |
| 2013/0159939 A1* | 6/2013 | Krishnamurthi | 715/863 |
| 2014/0199967 A1* | 7/2014 | Varoglu | H04W 12/06 455/411 |

\* cited by examiner

METHOD AND APPARATUS FOR UNLOCKING A USER PORTABLE WIRELESS ELECTRONIC COMMUNICATION DEVICE FEATURE

BACKGROUND

1. Field

The present disclosure is directed to a method and apparatus for user portable wireless electronic communication device operation. More particularly, the present disclosure is directed to unlocking a feature of a user portable wireless electronic communication device.

2. Introduction

Presently, user portable wireless electronic communication devices include wireless telephones, cellular phones, smartphones, personal digital assistants, selective call receivers, tablet computers, or any other wireless electronic communication device that can be carried by a user. These devices store private user data, such as user information, contact information, e-mails, pictures, and other private data that users and enterprises want to keep secure. To keep the private user data secure, devices employ password protection that prevents access to the data by unauthorized users. For example, a cellular phone can require a user to enter a personal identification number to unlock the phone.

Unfortunately, frequently entering a password on a device is tedious for users. For example, a user may frequently make calls, but may put the device to sleep in-between calls to conserve battery life. The user is then forced to enter a password each time the user makes a call. In fact, studies have shown that some users stop using their password because it is too much of a hassle. For example studies have shown that some users set a password after first receiving a device, but later stop using the password, apparently to avoid the hassle of entering a password. Furthermore, half of users of devices with password protection have stated that they do not lock their devices to avoid the hassle of entering a password. Other users may still dislike using a password, but they are enterprise users who are forced to use a password based on employment requirements or are users who put up with the extra hassle to keep their data more secure.

Face recognition is an alternate to password protection for user authentication. Unfortunately, face recognition has proven to not be reliable enough because it can authenticate a non-authorized user as an authorized user, which permits non-authorized users to access secure data and otherwise use the devices for unauthorized purposes. A fingerprint sensor is another alternate for user authentication. However a fingerprint sensor adds cost to the device. Furthermore, space constraints on a device limit the number of accessories that can be added to a device and a fingerprint sensor takes up valuable space in the device.

Thus, there is a need for an improved method and apparatus for unlocking a feature of a user portable wireless electronic communication device.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus for unlocking a feature of a user portable wireless electronic communication device. According to one embodiment, a user portable wireless electronic communication device can include a camera configured to capture a characteristic of a waving hand of a user across the user portable wireless electronic communication device. The user portable wireless electronic communication device can include a controller coupled to the camera. The controller can determine whether the user is authorized to access a locked feature of the user portable wireless electronic communication device based on the captured characteristic. The controller can unlock the locked feature if the user is authorized to access the feature.

According to another embodiment, a method can include capturing a characteristic of a waving hand of a user across a user portable wireless electronic communication device. The method can include determining whether the user is authorized to access a locked feature of the user portable wireless electronic communication device based on the captured characteristic. The method can include unlocking the locked feature if the user is authorized to access the feature.

Figure 1:
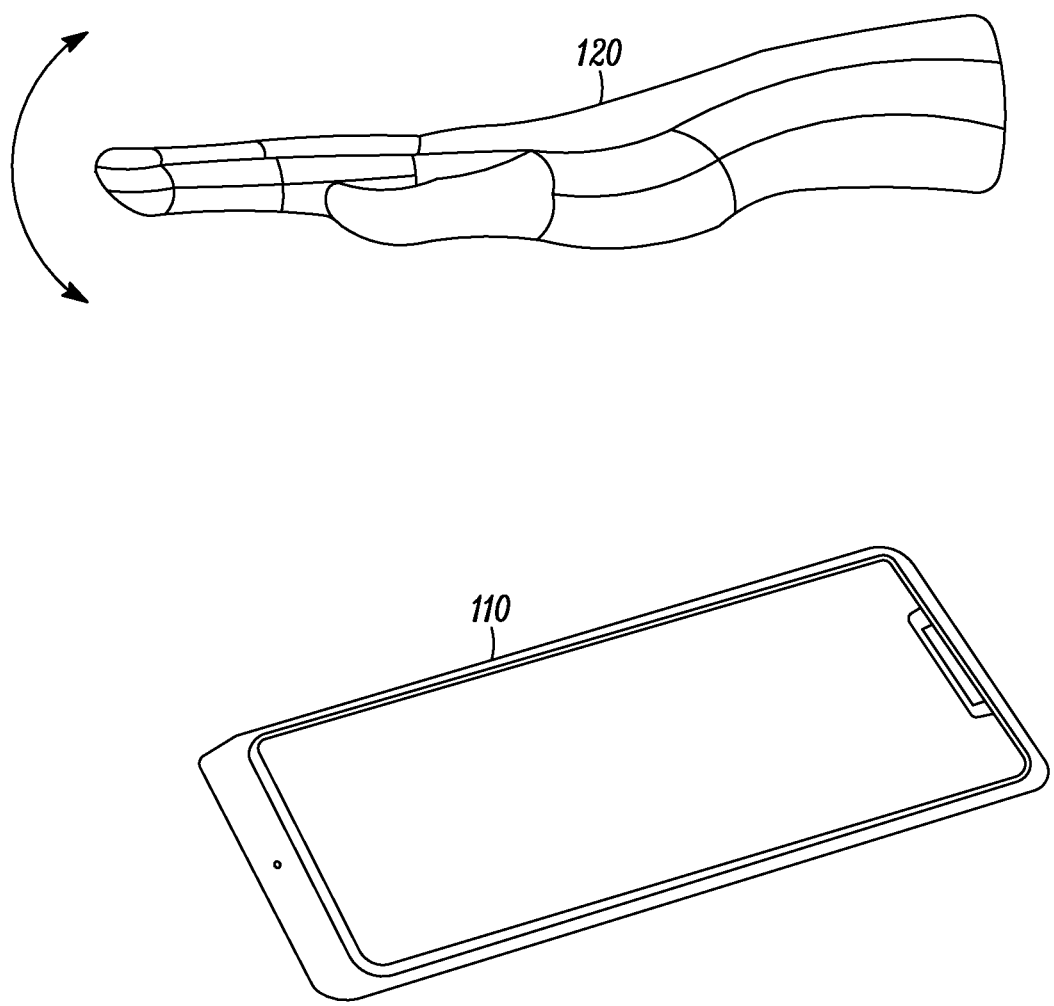
FIG. 1 is an example illustration of a user portable wireless electronic communication device and a waving hand according to a possible embodiment.

FIG. 1 is an example illustration of a user portable wireless electronic communication device 110 and a waving hand 120 of a user according to a possible embodiment. The user portable wireless electronic communication device 110 can be a wireless telephone, a cellular telephone, a smartphone, a personal digital assistant, a selective call receiver, a tablet computer, or any other wireless electronic communication device that can be carried by a user. In operation, the user portable wireless electronic communication device 110 can capture a video of a waving hand 120 gesture. The user portable wireless electronic communication device 110 can extract frames of the video to construct an image of the user's waving hand 120. Characteristics from the image of the user's hand 120 can be used to determine whether the user is authorized to use the user portable wireless electronic communication device 110.

Figure 2:
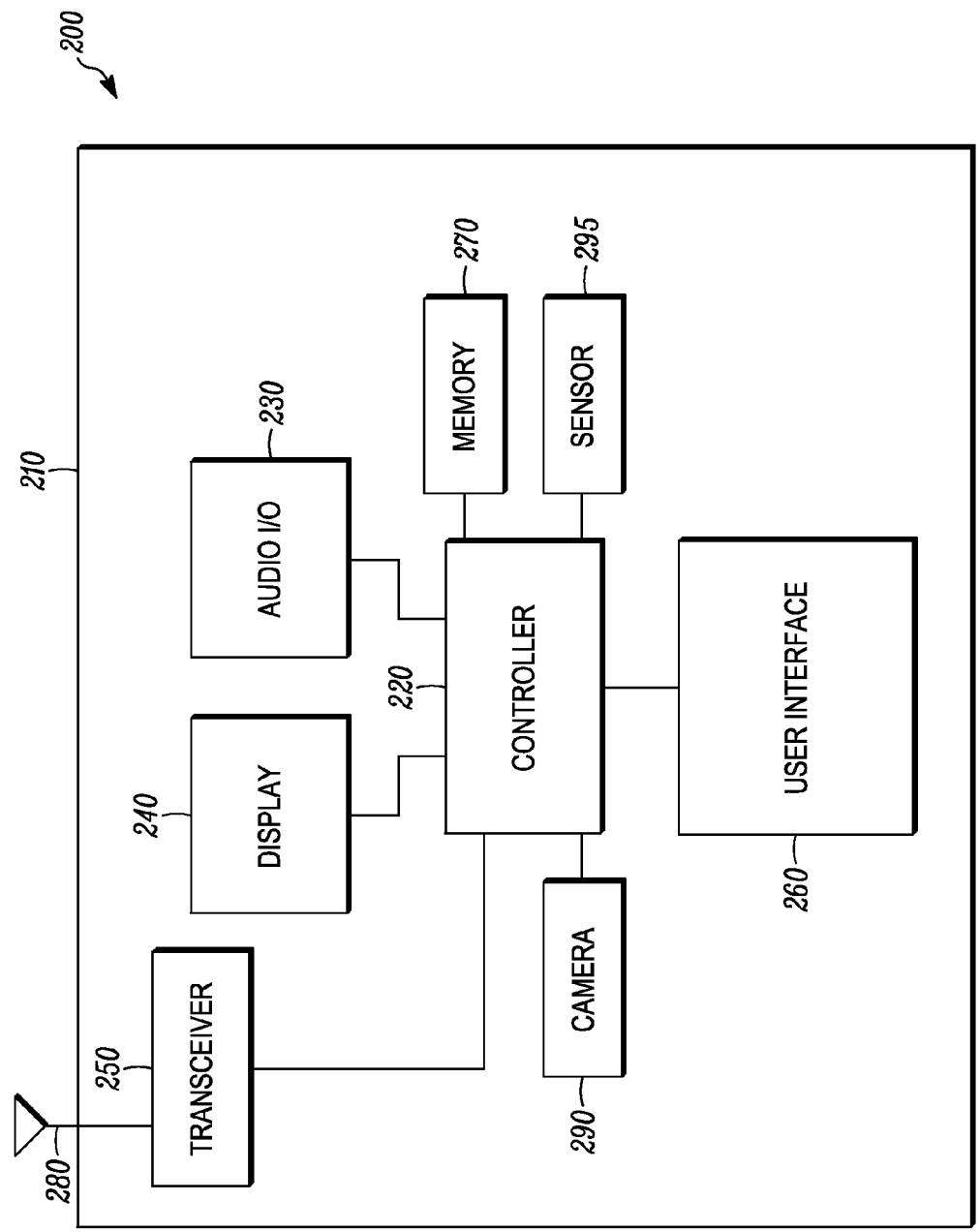
FIG. 2 is an example block diagram of a user portable wireless electronic communication device according to a possible embodiment.

FIG. 2 is an example block diagram of a user portable wireless electronic communication device 200, such as the user portable wireless electronic communication device 110, according to a possible embodiment. The user portable wireless electronic communication device 200 can include a housing 210, a controller 220 within the housing 210, audio input and output circuitry 230 coupled to the controller 220, a display 240 coupled to the controller 220, a transceiver 250 coupled to the controller 220, a user interface 260 coupled to the controller 220, a memory 270 coupled to the controller 220, an antenna 280 coupled to the transceiver 250, a camera 290 coupled to the controller 220, and a sensor 295 coupled to the controller 220.

The display 240 can be a liquid crystal display (LCD), a light emitting diode (LED) display, a plasma display, a projection display, a touch screen, or any other device for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, a touch screen display, another additional display, or any other device useful for providing an interface between a user and an electronic device. The memory 270 can include a random access memory, a read only memory, an optical memory, a subscriber identity module memory, a flash memory, a removable memory, a hard drive, a cache, or any other memory that can be coupled to a user portable wireless electronic communication device.

The user portable wireless electronic communication device 200 can perform the methods described in all the embodiments. Although not required, embodiments can be implemented using computer-executable instructions, such as program modules, being executed by an electronic device, such as a general purpose computer. Generally, program modules can include routine programs, objects, components, data structures, and other program modules that perform particular tasks or implement particular abstract data types. The program modules may be software-based and/or may be hardware-based. For example, the program modules may be stored on computer readable storage media, such as hardware discs, flash drives, optical drives, solid state drives, CD-ROM media, thumb drives, and other computer readable storage media that provide non-transitory storage aside from a transitory propagating signal. Moreover, embodiments may be practiced in network computing environments with many types of computer system configurations, including personal computers, hand-held devices, multi-processor systems, microprocessor-based or programmable consumer electronics, network personal computers, minicomputers, mainframe computers, and other computing environments.

In operation, the camera 290 can capture a characteristic of a waving hand, such as the waving hand 120, of a user across the user portable wireless electronic communication device 200. The waving hand can be a single hand wave across the device 200, can be multiple hand waves across the device 200, can be the user reaching for the device 200, or can be other hand gestures. The controller 220 can capture a characteristic by using the camera 290 to capture a video of the waving hand and can extract the characteristic from the video of the waving hand.

The display 240 can be a primary display located on the same side of the user portable wireless electronic communication device 200 as the camera 290. For example, the video can be captured using a front facing camera, such as a camera used for video chat. The camera 290 can capture the video with or without displaying a preview of the video on the display 240. For example, the camera 290 can capture the video when a lock screen is displayed, when an e-mail application is running, when a screen of an open application is displayed, when the display 240 is turned off, or when anything else is shown on the display 240.

The controller 220 can determine whether the user is authorized to access a locked feature of the user portable wireless electronic communication device 200 based on the captured characteristic. The locked feature can block access to device operation, can block access to files stored on the device 200, can block access to e-mail on the device 200, can block access to some or all applications on the device 200, or can be any other feature that requires authentication to access the feature on the device 200.

The controller 220 can unlock the locked feature if the user is authorized to access the feature. If the controller 220 does not determine the user is authorized to access a locked feature, the controller 220 can request additional authentication, such as by requesting a password, by requesting a personal identification number, requesting repetition of a hand gesture, or by requesting additional authentication information or actions.

To initiate user authentication, the controller 220 can detect a user action for user authentication and can activate a hand wave capture process to capture the characteristic of the waving hand based on detecting the user action for authentication. The device 200 can request waving hand authentication from the user after the controller 220 detects the user action. For example, the device 200 can display a message, can play audio, or can otherwise request waving hand authentication from the user. The device 200 can also initiate a hand wave capture process without explicitly requesting waving hand authentication from the user. The controller 220 can activate the camera 290 to activate the video hand wave capture process.

According to a possible implementation, the controller 220 can detect a user action by receiving user input on the user portable wireless electronic communication device 200, where the user input requests access to the locked feature. For example, a user can manually activate the camera 290 for video hand capture authentication such as by turning on the device 200, by opening an application that requires authentication, by attempting to open a file that requires authentication, by pressing a button, or by otherwise activating the camera 290 for authentication.

According to another possible implementation, the controller 220 can detect a user action by automatically detecting a user action using the sensor 295 for automatic authentication activation. The sensor 295 can be a proximity sensor, such as an always-on sensor, a light sensor, a heat sensor, or any other sensor or combination of sensors that detect when a user is close to the device 200, when the user's hand is close to the device 200, and/or when the user is waving a hand to unlock the device 200. The sensor 295 can trigger activation of the camera 290 for video hand capture. For example, a proximity sensor can detect when a user or the user's hand is within a certain range of the device 200 and can then activate the camera 290 for video hand capture authentication. The sensor 295 can include a plurality of sensors and can include a sensor hub separate from a device main microprocessor of the controller 220 to reduce power consumption of the device 200 when the device 200 is asleep while keeping the sensor 295 active. As a further example, a proximity sensor can include a light sensor. Light can be measured to approximate whether a hand was waved. The light may be in the visible spectrum or may be in other frequencies of light. Two proximity sensors can also be used to detect when one sensor is first triggered and then the other sensor is triggered and the controller 220 can identify that a hand was waved based on the timing of the detection between the two sensors. The controller 220 can also activate a hand wave capture process when the device 200 wakes up for other reasons, such as when a device clock alarm goes off, when a calendar reminder pops up, when a message is received, or for other reasons that wake up a device from an idle or sleep mode.

The controller 220 can determine whether the user is authorized to access a locked feature by extracting palm line information of at least one palm line on the waving hand from the captured characteristic. The controller 220 can determine whether the user is authorized to access a locked feature of the user portable wireless electronic communication device 200 based on the palm line information. A palm line can be a major palm line, such as a heart line, a head line, a life line, and/or a fate line, and can include other lines on a palm. For example, unique lengths, shapes, curves and arcs, and/or angles of palm lines, existence or absence of certain lines, other relationships between palm lines, and other hand data points can be used to distinguish an authorized user from an unauthorized user. Other characteristics of hand can also be used, such as hand shape, hand size, fingerprint features, subcutaneous features, such as vein features, or other features of a hand.

The controller 220 can to determine that ambient light is insufficient to capture the characteristic of a waving hand. The controller 220 can provide light from the user portable wireless electronic communication device 200 to capture the characteristic of the waving hand. For example, the display 240 can be used to provide more light for video capture in low light situations. Other light can also be provided from the device 200, such as light from a device flash, light from an illuminated keypad, infrared light, or other light that can provide an adequate image for video hand capture authentication.

The controller 220 can store authenticated user hand characteristic data in the memory 270. The authenticated user hand characteristic data can be from a hand of a user authenticated to use the device. The controller 220 can determine whether the user is authorized to access the locked feature based on comparing the authenticated user hand characteristic data to data extracted from the captured characteristic. For example, the authentication process can be trained or can be pre-provisioned to detect a waving hand and/or to authenticate the user.

Figure 3:
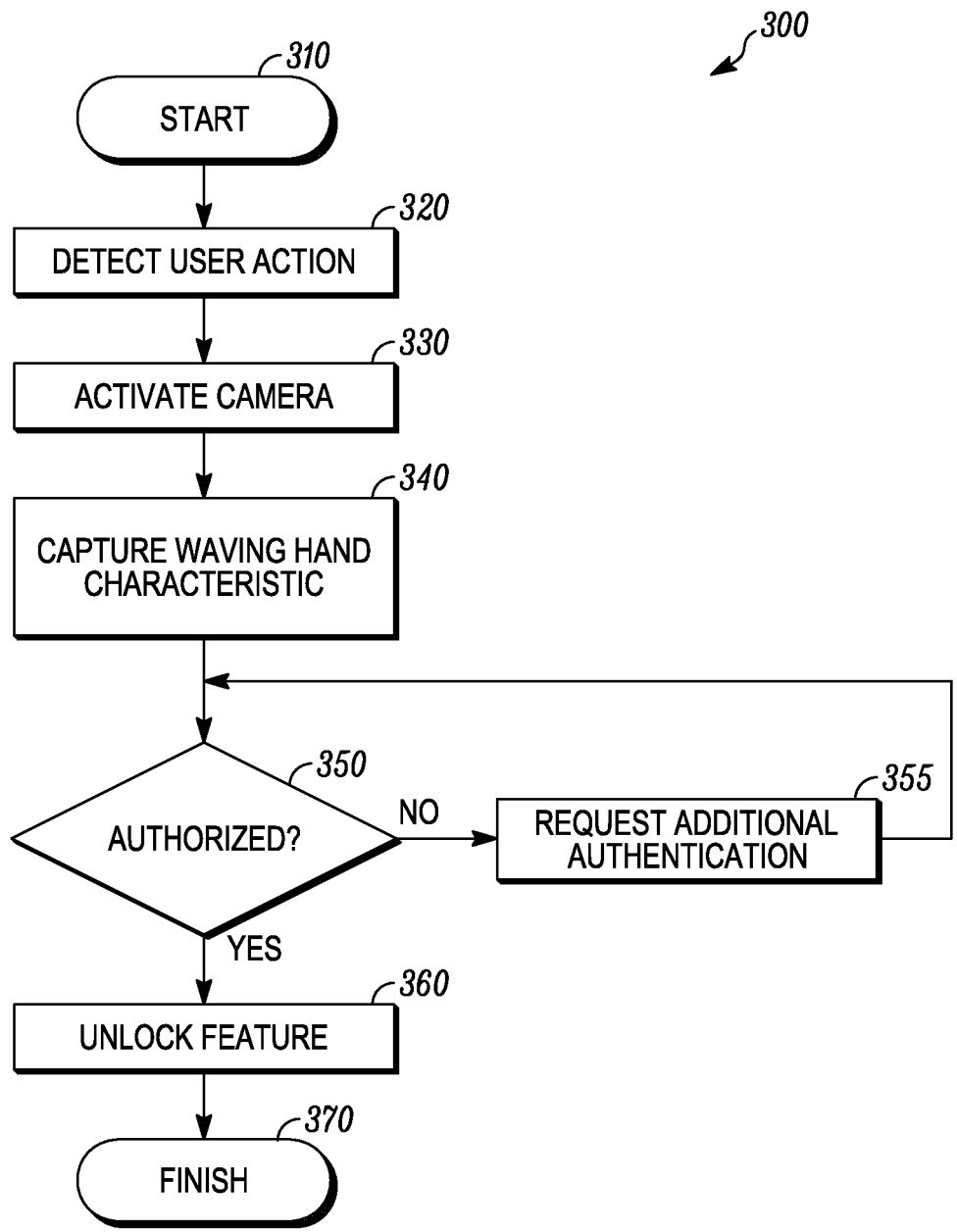
FIG. 3 is an example flowchart illustrating the operation of a user portable wireless electronic communication device according to a possible embodiment.

FIG. 3 is an example flowchart 300 illustrating operation of a user portable wireless electronic communication device, such as the user portable wireless electronic communication device 200, according to a possible embodiment. At 310, the flowchart can begin. At 320, the operation can include detecting a user action that initiates user authentication. The user action can be detected by using a proximity sensor, by receiving user input that requests access to the locked feature on the user portable wireless electronic communication device, or by otherwise detecting a user action. At 330, the operation can include activating a camera on the user portable wireless electronic communication device in response to detecting the user action. When activating the camera, the device can determine that ambient light is insufficient to capture the characteristic of a waving hand and can provide light to capture the characteristic of the waving hand. At 340, the operation can include capturing a characteristic of a waving hand of a user across a user portable wireless electronic communication device. The characteristic can be captured by capturing video using the camera and by extracting the characteristic from the video of the waving hand. At 350, the operation can include determining whether the user is authorized to access a locked feature of the user portable wireless electronic communication device based on the captured characteristic. Authenticated user hand characteristic data of a user authenticated to use the device can be stored on the device and the authenticated user hand characteristic data can be compared to data extracted from the captured characteristic to determine whether the user is authorized to access the locked feature. According to a possible implementation, the determination can be made by extracting palm line information of at least one palm line on a palm of the waving hand from the captured characteristic and by determining whether the user is authorized to access a locked feature of the user portable wireless electronic communication device based on the palm line information. At 355, if the operation determines the user is not authorized to access the locked feature based on the captured characteristic, then the operation can offer a back-up authentication method. For example, the operation can request a password, can request the user to re-attempt hand gesture authentication, can require the user to contact a service provider after repeated failed authentication, or can provide other operations useful for responding to a failed authentication.

At 360, the operation can include unlocking the locked feature if the user is authorized to access the feature. At 350, the flowchart 300 can end.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean at least one of, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method comprising:
   while a portable wireless electronic communication device is operating in a sleep mode:
   detecting, by a first proximity sensor of the portable wireless electronic communication device and at a first time, a trigger action;
   detecting, by a second proximity sensor of the portable wireless electronic communication device and at a second time, the trigger action; and
   determining, by the portable wireless electronic communication device, based on a difference between the first time and the second time, that the trigger action is a hand wave; and
   responsive to determining that the trigger action is the hand wave:

transitioning, by the portable wireless electronic communication device, from operating in the sleep mode to operating in an awake mode;

activating, by the portable wireless electronic communication device, a camera of the portable wireless electronic communication;

capturing, by the camera of the portable wireless electronic communication device, a video of a hand of a user waving across the portable wireless electronic communication device;

extracting, by the portable wireless electronic communication device, from the video, one or more characteristics of the hand of the user;

determining, by the portable wireless electronic communication device, whether the user is authorized to access a locked feature of the portable wireless electronic communication device by at least comparing the one or more characteristics of the hand of the user to authenticated user hand characteristic data of an authenticated user of the portable wireless electronic communication device; and responsive to determining that the user is authorized to access the locked feature, unlocking the locked feature.

2. The method according to claim 1, wherein the trigger action further comprises user input to request access to the locked feature.

3. The method according to claim 1, wherein the camera is located on the same side of the portable wireless electronic communication device as a primary display of the user portable wireless electronic communication device.

4. The method according to claim 1,
wherein extracting the one or more characteristics of the hand of the user comprises extracting, by the portable wireless electronic communication device, palm line information of at least one palm line on the hand of the user from the video, and wherein determining whether the user is authorized to access the locked feature of the portable wireless electronic communication device is based on the palm line information.

5. The method according to claim 1, further comprising:
responsive to determining that an amount of ambient light is insufficient to capture the video of the hand of the user, providing, by the portable wireless electronic communication device, light to increase the amount of ambient light during capture of the video of the hand of the user.

6. The method according to claim 1, wherein the authenticated user hand characteristic data is stored by the portable wireless electronic communication device.

7. A portable wireless electronic communication device comprising:
a first proximity sensor configure to detect, while the portable wireless electronic communication device is operating in a sleep mode, a trigger action, wherein the first proximity sensor detects the trigger action at a first time;

a second proximity sensor configured to detect the trigger action, wherein the second proximity sensor detects the trigger action at a second time;

a camera; and a controller coupled to the camera, the controller configured to determine, based on a difference between the first time and the second time, that the trigger action is a hand wave, transition the portable wireless electronic communication device from operating in the sleep mode to operating in an awake mode in response to determining that the trigger action is a hand wave, and activate the camera, wherein the camera is configured to capture a video of a hand of a user waving across the portable wireless communication device, and wherein the controller is further configured to extract, from the video, one or more characteristics of the hand of the user, determine whether the user is authorized to access a locked feature of the portable wireless electronic communication device by at least comparing the one or more characteristics of the hand of the user to authenticated user hand characteristic data of an authenticated user of the portable wireless electronic communication device, and, responsive to determining that the user is authorized to access the locked feature, unlock the locked feature.

8. The portable wireless electronic communication device according to claim 7, wherein the trigger action further comprises user input to request access to the locked feature.

9. The portable wireless electronic communication device according to claim 7, further comprising:
a primary display coupled to the controller and located on the same side of the portable wireless electronic communication device as the camera.

10. The portable wireless electronic communication device according to claim 7, wherein the controller is configured to extract palm line information of at least one palm line on the hand of the user from the video, and determine whether the user is authorized to access the locked feature of the portable wireless electronic communication device based on the palm line information.

11. The portable wireless electronic communication device according to claim 7, wherein the controller is configured to, responsive to determining that an amount ambient light is insufficient to capture the video of the hand, cause the portable wireless electronic communication device to provide light to increase the amount of ambient light during capture of the video.

12. The portable wireless electronic communication device according to claim 7, wherein the controller is configured to store the authenticated user hand characteristic data.

* * * * *